United States Patent
Song et al.

(10) Patent No.: US 9,914,811 B2
(45) Date of Patent: Mar. 13, 2018

(54) WINDOW FOR DISPLAY DEVICE AND DISPLAY DEVICE INCLUDING THE WINDOW

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Sun Jin Song, Seoul (KR); Chanjae Ahn, Seoul (KR); Kyeong-sik Ju, Suwon-si (KR); Jungha Chae, Yongin-si (KR); Sungwoo Hong, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 135 days.

(21) Appl. No.: 14/980,699

(22) Filed: Dec. 28, 2015

(65) Prior Publication Data
US 2016/0185926 A1     Jun. 30, 2016

(30) Foreign Application Priority Data
Dec. 26, 2014 (KR) .......................... 10-2014-0191068

(51) Int. Cl.
| C08G 73/14 | (2006.01) |
| C08J 7/04 | (2006.01) |
| G02B 1/04 | (2006.01) |
| G02B 1/12 | (2006.01) |
| G02B 1/14 | (2015.01) |

(52) U.S. Cl.
CPC .............. *C08J 7/047* (2013.01); *C08G 73/14* (2013.01); *C08J 2369/00* (2013.01); *C08J 2379/08* (2013.01); *C08J 2400/21* (2013.01); *C08J 2433/06* (2013.01); *C08J 2463/00* (2013.01); *C08J 2467/04* (2013.01); *C08J 2475/04* (2013.01); *C08J 2483/04* (2013.01); *G02B 1/04* (2013.01); *G02B 1/14* (2015.01)

(58) Field of Classification Search
CPC .................................... G02B 1/04; G02B 1/14
See application file for complete search history.

(56) References Cited

U.S. PATENT DOCUMENTS

| 7,871,554 B2 | 1/2011 | Oishi et al. |
| 8,274,744 B2 | 9/2012 | Haralur et al. |
| 2012/0113032 A1 | 5/2012 | Itakura et al. |

(Continued)

FOREIGN PATENT DOCUMENTS

| EP | 0783960 A2 | 1/1997 |
| EP | 2800104 A1 | 11/2014 |

(Continued)

OTHER PUBLICATIONS

Extended European Search Report dated Jun. 7, 2016, of the corresponding European Patent Application No. 15202722.3.

(Continued)

*Primary Examiner* — Ramsey E Zacharia
(74) *Attorney, Agent, or Firm* — Cantor Colburn LLP

(57) ABSTRACT

A window for a display device including a plastic substrate having yield strain of greater than or equal to about 0.8% at about 85 degrees Celsius and 85% relative humidity and a hard coating layer disposed on at least one side of the plastic substrate.

6 Claims, 2 Drawing Sheets

(56) References Cited

U.S. PATENT DOCUMENTS

| | | | |
|---|---|---|---|
| 2015/0225607 A1 | 8/2015 | Cho et al. | |
| 2015/0247241 A1* | 9/2015 | Ezure | C23C 16/22 |
| | | | 428/446 |
| 2015/0252210 A1 | 9/2015 | Kang et al. | |
| 2015/0252212 A1 | 9/2015 | Kang et al. | |
| 2015/0299504 A1 | 10/2015 | Kang et al. | |
| 2015/0299505 A1 | 10/2015 | Kang et al. | |
| 2015/0363030 A1 | 12/2015 | Nam et al. | |

FOREIGN PATENT DOCUMENTS

| | | |
|---|---|---|
| JP | 2014505266 A | 2/2014 |
| KR | 101238967 B1 | 2/2013 |
| KR | 1020140027027 A | 3/2014 |
| WO | 2013120275 A1 | 8/2013 |

OTHER PUBLICATIONS

Chin-Ping Yang et al. "New Poly(amide-Imide)s Syntheses. I. Soluble High-Temperature Poly(amide-Imide)s Derived from 2,5-Bis(4-Trimellitimidophenyl)-3,4-Diphenylthiophene and Various Aromatic Diamines", Polymer Chemistry vol. 30, 1855-1864 (1992).

Denis Y. W. Yu et al. "The yield strength of thin copper films on Kapton", Journal of Applied Physics 95, 2991 (2004).

Jin Woo Kang et al. "Structure-property relationships of polyimides: a molecular simulation approach", Polymer vol. 39 No. 26, pp. 7079-7087, 1998.

Jongchul Seo et al. "Effect of Isomeric Oxydiphenylene Diamine on the Water Sorption Behavior of High Temperature Polyimide Thin Films", Polymer Journal, vol. 31, No. 4, pp. 324-331 (1999).

* cited by examiner

WINDOW FOR DISPLAY DEVICE AND DISPLAY DEVICE INCLUDING THE WINDOW

CROSS-REFERENCE TO RELATED APPLICATION

This application claims priority to and the benefit of Korean Patent Application No. 10-2014-0191068 filed in the Korean Intellectual Property Office on Dec. 26, 2014, the entire contents of which are incorporated herein by reference.

BACKGROUND

1. Field

A window for a display device and a display device including the same are disclosed.

2. Description of the Related Art

A portable display device such as a smart phone or a tablet PC has been an object of active research due to its attractively high performance and popularity. For example, a light-weight flexible (i.e., bendable or foldable) portable display device has been studied and developed for commercializing. The portable display device of a liquid crystal display or the like includes a protective window for protecting a display module such as a liquid crystal layer. Currently, most portable display devices include a window including a rigid glass substrate. However, the glass is easily broken by extraneous impacts and is difficult to be applied in a flexible display.

Unlike glass, the window for a display including a plastic substrate is light in weight and is readily used in a flexible (bendable or foldable) display. However, the window disposed on the uppermost surface of the flexible display may be repeatedly folded under high temperature and high humidity as well as room temperature and normal humidity.

The mechanical properties of the plastic material may be dramatically changed depending upon humidity and temperature. Accordingly, the mechanical properties and/or the optical properties of the plastic substrate may be significantly deteriorated under the high temperature and the high humidity conditions even when the plastic substrate has good resistance to bending and folding under room temperature and usual humidity.

Thus, there remains a need for a light-weight protective window which may be used in a flexible display device in a wide temperature and humidity range.

SUMMARY

An embodiment provides a light-weight protective window applicable for use in a flexible (bendable or foldable) display in a wide range of temperature/humidity.

Another embodiment provides a display device including the protective window.

In an embodiment, a window for a display device includes a plastic substrate and a hard coating layer disposed on at least one side of the plastic substrate, wherein the plastic substrate has a yield strain of greater than or equal to about 0.8% at about 85 degrees Celsius and 85% relative humidity.

The plastic substrate may include a polyimide, a poly (imide-amide) copolymer, a polycarbonate, and the like.

The plastic substrate may have a yellow index ASTM E313 of less than or equal to 3.5.

The plastic substrate may have a thickness of about 25 micrometers to about 100 micrometers.

The hard coating layer may be an acrylate polymer, polycaprolactone, a urethane-acrylate copolymer, polyrotaxane, an epoxy polymer, an organosilicon material such as polysilsesquioxane, an inorganic hard coating material, or a combination thereof.

According to another embodiment, a display device may include the window.

The window may be disposed on a display module of the display device.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
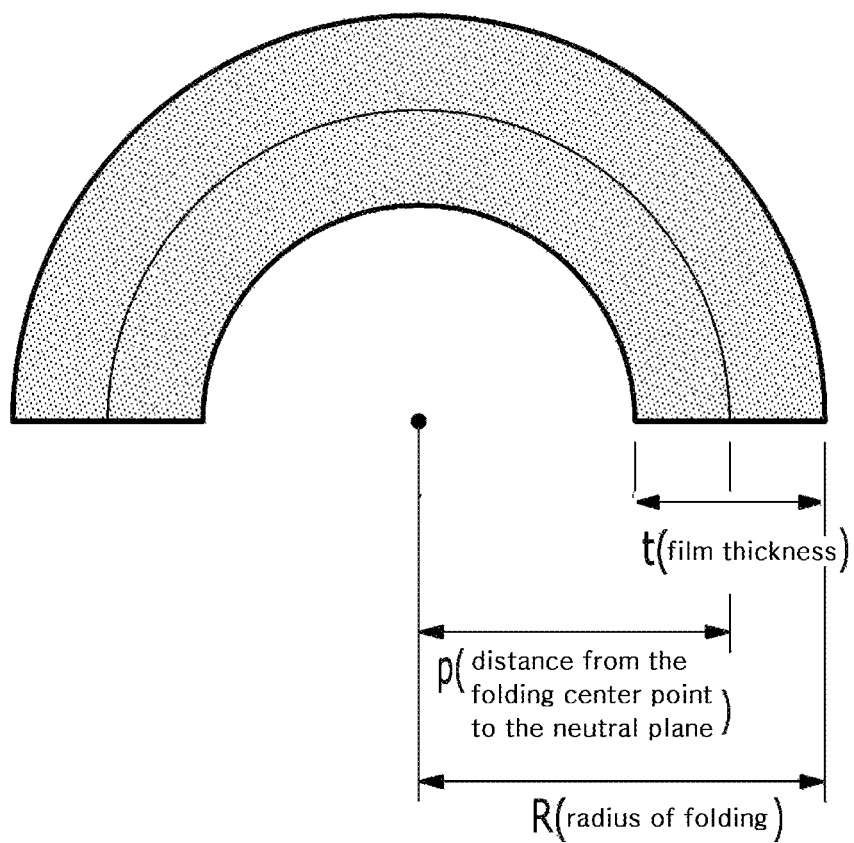
FIG. 1 is a schematic view showing a plastic substrate folded at a radius of folding (R) according to an embodiment.

Hereinafter, embodiments are described in detail. However, these embodiments are exemplary, and this disclosure is not limited thereto.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when specific definition is not otherwise provided, the term "substituted" refers to one substituted with at least one substituent selected from a halogen (—F, —Cl, —Br, or —I), a hydroxy group, a nitro group, a cyano group, an amino group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, instead of at least one hydrogen of the given functional group, and the substituents may be linked to each other to provide a ring.

As used herein, when specific definition is not otherwise provided, the term "alkyl group" refers to a C1 to C30 alkyl group, the term "cycloalkyl group" refers to a C3 to C30 cycloalkyl group, the term "alkoxy group" refers to a C1 to C30 alkoxy group, and the term "aryl group" refers to a C6 to C30 aryl group.

As used herein, the term "alkyl group" may refer to a group derived from a straight or branched chain saturated aliphatic hydrocarbon having the specified number of carbon atoms and having a valence of one.

As used herein, the term "alkoxy group" may refer to "alkyl-O—", wherein the term "alkyl" has the same meaning as described above.

As used herein, the term "cycloalkyl group" may refer to a monovalent group having one or more saturated rings in which all ring members are carbon.

As used herein, the term "cycloalkoxy group" may refer to "cycloalkyl-O—", wherein the term "cycloalkyl" has the same meaning as described above.

As used herein, the term "aryl", which is used alone or in combination, may refer to a monovalent aromatic hydrocarbon group containing at least one ring and having the specified number of carbon atoms. The term "aryl" may be construed as including a group with an aromatic ring fused to at least one cycloalkyl ring.

As used herein, the term "aryloxy group" may refer to "aryl-O—", wherein the term "aryl" has the same meaning as described above.

The term "heteroaryl group" may refer to a monovalent aromatic group including carbon and 1 to 3 heteroatoms selected from the group consisting of N, O, S, and P as ring atoms.

As used herein, the term "alkylene group" may refer to a straight or branched saturated aliphatic hydrocarbon group having a valence of at least two (e.g., a valence of two), optionally substituted with one or more substituents where indicated, provided that the valence of carbon is not exceeded.

As used herein, the term "cycloalkylene group" may refer to a cyclic hydrocarbon group having a valence of at least two (e.g., a valence of two), optionally substituted with one or more substituents where indicated, provided that the valence of the carbon is not exceeded.

As used herein, the term "arylene group" may refer to a functional group having a valence of at least two (e.g., a valence of two) obtained by removal of two or more (e.g., two) hydrogens in an aromatic ring, optionally substituted with one or more substituents where indicated, provided that the valence of carbon is not exceeded.

As used herein, the term "heterocyclic group" refers to a group including 1 to 3 heteroatoms selected from O, S, N, P, Si, and a combination thereof in one ring, and may be, for example, pyridine, thiophene, pyrazine, and the like, but is not limited thereto.

In an embodiment, a window for a display device includes a plastic substrate and a hard coating layer disposed on at least one side of the plastic substrate, wherein the plastic substrate has a yield strain of greater than or equal to about 0.8% at about 85 degrees Celsius and 85% relative humidity. In an embodiment, a window for a display device includes the plastic substrate 100 and a hard coating layer 200 disposed on at least one side (e.g., one side or both sides) of the plastic substrate 100 (referring to FIGS. 2 and 3).

For commercializing a bendable or foldable display device, a window for the device needs to be developed. In order to use the window in the flexible display, the window may preferably include a plastic substrate having excellent flexure resistance compared to a glass substrate. The plastic substrate may have excellent flexure resistance at room temperature and humidity of less than or equal to 50%. However, the mechanical properties thereof may be rapidly deteriorated under the conditions of high temperature and high humidity, so the appearance of the plastic substrate may be easily deformed when flexural-stressed.

In order to solve these problems, the window according to an embodiment includes a plastic substrate having a yield strain of greater than or equal to about 0.8% at a temperature of about 85 r and relative humidity of 85%.

In the specification, the yield strain may be determined as follows: a specimen having a size of about 5 to 10 millimeters (mm) width and a length of about 15 to 20 mm is allowed to stand at a predetermined temperature/humidity (i.e., a temperature of about 85° C. and relative humidity of 85%) for greater than or equal to about 30 minutes. The specimen is applied with constantly increasing force in a DMA (Dynamic Mechanical Analysis) device to provide a stress-strain curve. For example, a force increasing by about 0.5 Newtons per minute (N/min)-18 N/min is applied to the specimen to provide a stress-strain curve, and elastic modulus may be obtained from the initial linear region of the curve. The linear region is defined by the case when the coefficient of determination (R2) of the linear trend line is the maximum or greater than or equal to about 0.999, and the yield strain is defined by the strain approaching the stress-strain curve at 0.2% offset of linear slope line.

When the time during which the film is allowed to stand at a predetermined high temperature and a high humidity (i.e., about 85° C. and 85% relative humidity) is less than about 30 minutes, the physical property of the film is less deteriorated, so it is difficult to evaluate the flexure resistance at high temperature and high humidity. In addition, the film may be slowly or rapidly bent or unbent, so the film having a high yield strain regardless of speed may have sufficient flexure resistance to provide a window film for a foldable display. As the window film may have higher mechanical properties such as a high modulus or a high yield strain in drawing the same at a high speed, the properties may be measured while slowly drawing in order to satisfy the flexure resistance at the various conditions. According to examples and comparative examples in the specification, the force is slowly applied at a speed of about 0.5 N/min to measure the yield strain.

The yield strain of a film refers to a strain showing yield behavior in the stress-strain curve. In the elastic region before the yielding point, the film is returned to the original state when stress is removed. However, when is deformed higher than the yield strain, the film is not returned to the original state even when stress is removed and the film is permanently deformed. Accordingly, in order to provide a window applicable for the foldable display device or the like with flexure resistance, the window film may have to have a high yield strain.

Referring to FIG. 1, in the folded film having a thickness t, the neutral plane has no change in length, the outer surface with respect to the neutral plane is stretched, and the inner surface is compressed. On the outer surface, the extensional strain is changed depending upon the film thickness and the curvature radius according to the following equation.

$$\epsilon_{max} = \pm \frac{t/2}{\rho} = \pm \frac{t}{2(R-t/2)}$$

In the above equation, t is a film thickness,

ρ is a distance from the folding center point to the neutral plane, R is a radius of folding, and $\epsilon_{max}$ is a maximum strain of the outer surface or the inner surface.

According to the equation, when the radius of folding is high and when the film is thin, the outer surface may have lower extensional strain. On the contrary, when the radius of folding is low and the film is thick, the outer surface may have the higher extensional strain. For example, the strains of the outer surface according to a radius of folding and a thickness are shown in the following Table 1.

TABLE 1

|  | Film thickness (μm) | $\epsilon_{max}$ (%) |
| --- | --- | --- |
| R = 5 mm | 80 | 0.8 |
|  | 50 | 0.5 |
| R = 3 mm | 80 | 1.4 |
|  | 50 | 0.8 |
|  | 25 | 0.4 |
| R = 1 mm | 50 | 2.6 |
|  | 25 | 1.3 |
|  | 15 | 0.8 |

Accordingly, in order to apply the same for a bendable or foldable display, in the window according to an embodiment, the yield strain required for the plastic substrate may depend on a radius of folding and a thickness of film.

For example, at a radius of folding of about 5 mm (5R), when the film thickness is about 80 μm the strain of the outer surface is about 0.8%, and the strain of the outer surface is 0.5% when the film thickness is about 50 μm. At a radius of folding of about 3 mm (3R), when the film thickness is about 80 μm, the strain of the outer surface is about 1.4%, and the strain of the outer surface is 0.8% when the film thickness is about 50 μm.

In the case of the window according to the embodiments, the plastic substrate has a yield strain of greater than or equal to about 0.8%, and thus, it may satisfy the flexure resistance for a film having a thickness of less than or equal to about 80 μm at a radius of folding of greater than or equal to about 5 mm (5R). In addition, in the case of the window according to an embodiment, the plastic substrate may satisfy the flexure resistance for a film having a thickness of less than or equal to about 50 μm at a radius of folding of greater than or equal to about 3 mm. Furthermore, the plastic substrate may satisfy the flexure resistance for a film having a thickness of less than or equal to about 15 μm at a radius of folding of greater than or equal to about 1 mm.

The plastic substrate has a yield strain of greater than about 0.8% under the severe conditions of a temperature of 85° C. and relative humidity of 85%, so the window including the plastic substrate may ensure excellent flexure resistance even if included in the bendable or foldable display under the severe conditions of a high temperature and high humidity as well as under the conditions of room temperature and usual humidity.

In a window for a display device according to an embodiment, the plastic substrate may include a poly(imide-amide) copolymer including an imide repeating unit represented by the following Chemical Formula 1 and an amide repeating unit represented by the following Chemical Formula 2.

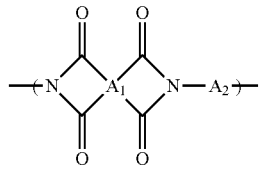

Chemical Formula 1

In Chemical Formula 1, $A_1$ is a residual group selected from a substituted or unsubstituted tetravalent C5 to C24 aliphatic cyclic group, a substituted or unsubstituted tetravalent C6 to C24 aromatic ring group, and a substituted or unsubstituted tetravalent C4 to C24 hetero aromatic ring group, wherein the aliphatic or aromatic ring group is present alone; two or more rings are fused to each other to provide a polycyclic aromatic ring; or the two or more aliphatic rings or the two or more aromatic rings are linked through a single bond, —O—, —S—, —CO—, —CH(OH)—, —SO$_2$—, —Si(CH$_3$)$_2$—, —(CH$_2$)$_p$— (wherein 1≤p≤10), —(CF$_2$)$_q$— (wherein 1≤q≤10), a C1 to 010 divalent alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, or —C(=O)NH—, A$_2$ is a residual group selected from a substituted or unsubstituted divalent C5 to C24 aliphatic cyclic group, a substituted or unsubstituted divalent C6 to C24 aromatic ring group, a substituted or unsubstituted divalent C4 to C24 hetero aromatic ring group, and -L-SiR$_2$—O—SiR$_2$-L- (wherein L is a single bond or a C1 to C10 alkylene group and R$_2$ is a C1 to C10 alkyl group), wherein the aliphatic or aromatic ring group is present alone; two or more rings are fused to each other to provide a polycyclic aromatic ring; or the two or more aliphatic rings or the two or more aromatic rings are linked through a single bond, —O—, —S—, —CO—, —CH(OH)—, —SO$_2$—, —Si(CH$_3$)$_2$—, —(CH$_2$)$_p$— (wherein 1≤p≤10), —(CF$_2$)$_q$— (wherein 1≤q≤10), a C1 to 010 divalent alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, or —C(=O)NH—.

Chemical Formula 2

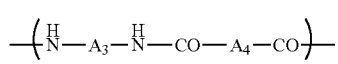

In Chemical Formula 2,

A$_3$ is a residual group selected from a substituted or unsubstituted divalent C5 to C24 aliphatic cyclic group, a substituted or unsubstituted divalent C6 to C24 aromatic ring group, a substituted or unsubstituted divalent C4 to C24 hetero aromatic ring group, and -L-SiR$_2$—O—SiR$_2$-L- (wherein L is a single bond or a C1 to C10 alkylene group and R$_2$ is a C1 to C10 alkyl group), wherein the aliphatic or aromatic ring group is present alone; two or more rings are fused to each other to provide a polycyclic aromatic ring; or the two or more aliphatic rings or the two or more aromatic rings are linked through a single bond, —O—, —S—, —CO—, —CH(OH)—, —SO$_2$—, —Si(CH$_3$)$_2$—, —(CH$_2$)$_p$— (wherein 1≤p≤10), —(CF$_2$)$_p$— (wherein 1≤q≤10), a C1 to 010 divalent alkylene group having at least one substituent selected from a 01 to 010 linear or branched aliphatic hydrocarbon group, a C1 to C10 fluoroalkyl group, a C6 to C20 aromatic hydrocarbon group, and a C6 to C20 alicyclic hydrocarbon group, or —C(=O)NH—, and A$_4$ is a substituted or unsubstituted divalent phenylene residual group, a substituted or unsubstituted divalent naphthalene residual group, or a residual group where two substituted or unsubstituted aromatic rings are linked through a single bond, —O—, —S—, —C(=O)—, —SO$_2$—, —Si(CH$_3$)$_2$—, —(CR'$_2$)$_p$— (wherein 1≤p≤10, R' is hydrogen, a hydroxy group, a C1 to C3 alkyl group, or a C1 to C3 fluoroalkyl group), or (CF$_2$)$_q$ (wherein 1≤q≤10).

For example, A$_1$ may be selected from the following groups.

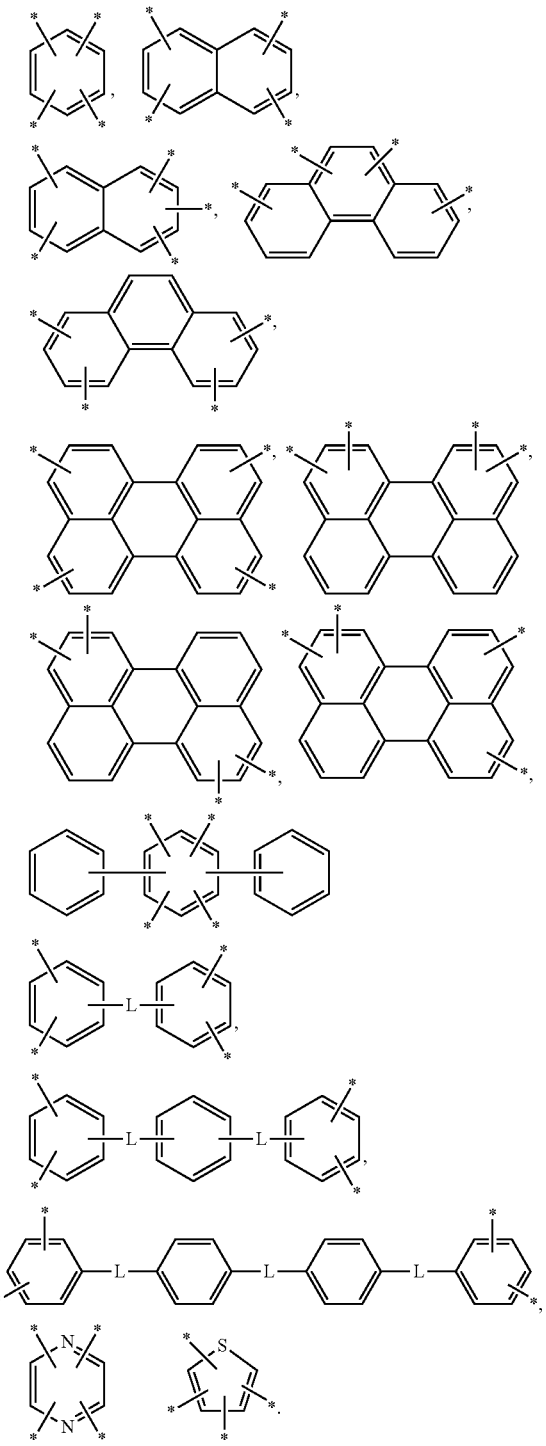

Herein, in the chemical formulae, each L is the same as or different from each other and are each independently a direct bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —CR'$_2$— (wherein each R' is the same or different from each other and are independently hydrogen, a C1 to C10 linear or branched aliphatic hydrocarbon group, a C6 to C20 aromatic hydrocarbon group, or a C6 to C20 alicyclic hydrocarbon group, and two groups R' are not both hydrogen), —C(CF$_3$)$_2$—, —C(CF$_3$)(C$_6$H$_5$)—, or —C(=O)NH—, and the aromatic ring is unsubstituted, or is substituted with a C1 to C15 alkyl group, —F, —Cl, —Br, —I, a C1 to C15 haloalkyl group, C1 to C15 alkoxy group, a C6 to C12 aryl group, a C6 to C12 aryloxy group, a nitro group, a hydroxy group, or a combination thereof, instead of at least one hydrogen, and

* indicates a point linked to carbon of the carbonyl group.

The A$_2$ may be selected from the following groups.

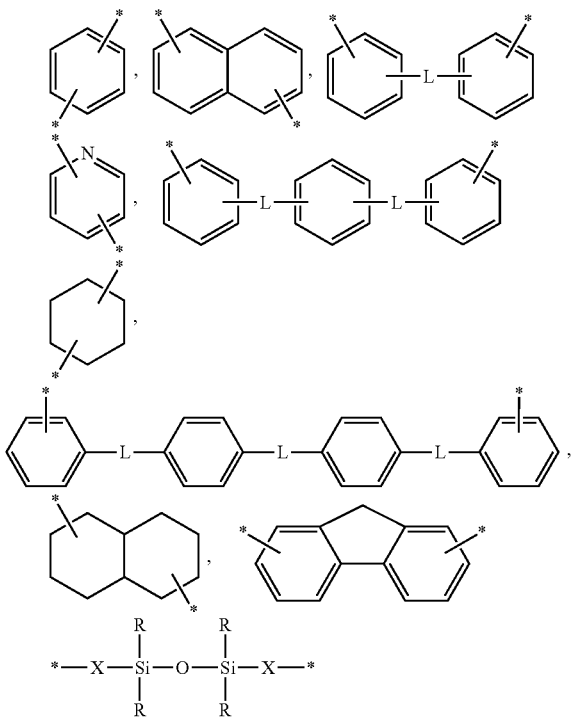

Herein, in the chemical formulae, each L is the same or different from each other and are each independently a direct bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_p$— (wherein 1≤q≤10), —CR'$_2$— (wherein R' is the same or different from each other and are independently hydrogen, a C1 to C10 linear or branched aliphatic hydrocarbon group, a C6 to C20 aromatic hydrocarbon group, or a C6 to C20 alicyclic hydrocarbon group, and two groups R' are not both hydrogen), —C(CF$_3$)$_2$—, —C(CF$_3$)(C$_6$H$_5$)—, or —C(=O)NH—, each X is the same or different from each other and are each independently a substituted or unsubstituted C1 to C10 alkylene group, a substituted or unsubstituted C4 to C20 cycloalkylene group, or a substituted or unsubstituted C6 to C20 arylene group, and the aromatic or alicyclic ring is unsubstituted, or is substituted with a C1 to C15 alkyl group, —F, —Cl, —Br, —I, a C1 to C15 haloalkyl group, a C1 to C15 alkoxy group, a C6 to C12 aryloxy group, a nitro group, a hydroxy group, or a combination thereof, instead of at least one hydrogen, and

* indicates a point linked to nitrogen of the imide ring.

In an embodiment, in Chemical Formula 1 and Chemical Formula 2, at least one of A$_1$, A$_2$, and A$_3$ may include a residual group including a side chain (e.g., a relatively bulky side chain). That is, in Chemical Formula 1 and Chemical Formula 2, at least one of A$_1$, A$_2$, and A$_3$ may include an aromatic ring (e.g., phenylene, biphenylene, cyclohexylene, and the like) substituted with at least one C1 to C3 fluoroalkyl group (e.g., a trifluoromethyl group); or two aliphatic or aromatic rings linked to each other by a C1 to C10 alkylene group having at least one residual group selected from a C1 to C10 linear or branched aliphatic hydrocarbon residual group (e.g., methyl, ethyl, propyl, isopropyl, and the like), a C1 to C10 fluorine alkyl residual group (e.g., trifluoromethyl group), a C6 to C20 aromatic hydrocarbon residual group (e.g., benzyl, fluorenyl, and the like), and a C6 to C20 alicyclic hydrocarbon residual group (e.g., cyclohexyl, and the like); or a combination thereof.

The poly(imide-amide) copolymer may include the residual group having the bulky side chain at a ratio of greater than or equal to about 1%, for example, greater than or equal to about 5%, greater than or equal to about 10%, greater than or equal to about 20%, greater than or equal to about 30%, greater than or equal to about 40%, greater than or equal to about 50%, or greater than or equal to about 60%, based on the total mole number of residues of the poly(imide-amide) copolymer.

In an embodiment, the A$_1$ may be selected from the following groups.

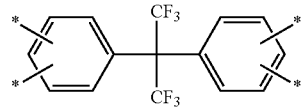

Herein, in the chemical formula,

* indicates a point linked to carbon of the carbonyl group, and each phenyl ring is unsubstituted, or is substituted with a C1 to C15 alkyl group, —F, —Cl, —Br, —I, a C1 to C15 haloalkyl group, a C1 to C15 alkoxy group, a C6 to C12 aryl group, a C6 to C12 aryloxy group, a nitro group, a hydroxy group, or a combination thereof, instead of at least one hydrogen. The A$_1$ represented by the chemical formula may be present in an amount of greater than or equal to about 1%, for example, greater than or equal to about 5%, greater than or equal to about 12%, or greater than or equal to about 20% based on the total molar amount of the repeating unit derived from acid dianhydride in the polyimide.

In an embodiment, the A$_2$ and A$_3$ are represented by the following formula.

Herein, in the chemical formula,

* indicates a point linked to an adjacent atom (e.g., nitrogen), and each phenyl ring is unsubstituted, or is substituted with a C1 to C15 alkyl group, —F, —Cl, —Br, —I, a C1 to C15 haloalkyl group, a C1 to C15 alkoxy group, a C6 to C12 aryloxy group, a nitro group, a hydroxy group, or a combination thereof, instead of at least one hydrogen. The A$_2$ represented by the chemical formula may be present in an amount of greater than or equal to about 1%, for example, greater than or equal to about 5%, greater than or equal to about 10%, greater than or equal to about 25%, greater than or equal to about 50%, or greater than or equal to about 75% or 100% based on the total molar amount of the repeating unit derived from diamine in the poly(imide-amide) copolymer.

In an embodiment, the imide repeating unit in the poly(imide-amide) copolymer may include a first repeating unit represented by the following Chemical Formula 1-1 and a second repeating unit represented by the following Chemical Formula 1-2:

Chemical Formula 1-1

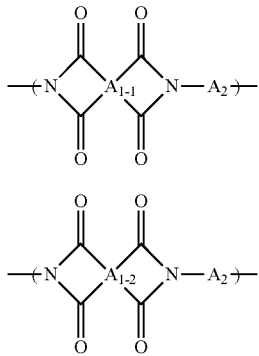

Chemical Formula 1-2 wherein, in the chemical formulae,
$A_{1-1}$ is represented by the following formula:

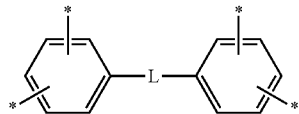

wherein L is a single bond, —O—, —S—, —C(=O)—, —SO$_2$—, —Si(CH$_3$)$_2$—, or —(CR'$_2$)$_p$— (wherein 1≤p≤10, and R' is hydrogen, a hydroxy group, a C1 to C3 alkyl group, or a C1 to C3 fluoroalkyl group),
$A_{1-2}$ is represented by the following formula:

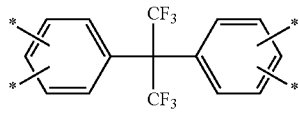

and
$A_2$ is represented by the following formula:

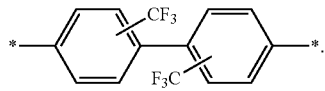

The plastic substrate may be obtained by making a film having a desirable thickness using a poly(imide-amide) copolymer. The poly(imide-amide) copolymer may be prepared by condensation polymerization of a diamine monomer, an acid dianhydride monomer, and an aromatic dicarbonyl monomer represented by the following chemical formula in an organic solvent:

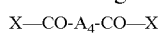
X—CO-A$_4$-CO—X wherein A$_4$ is a substituted or unsubstituted divalent phenylene residual group, a substituted or unsubstituted divalent naphthalene residual group, or a residual group where two substituted or unsubstituted aromatic rings are linked through a single bond, —O—, —S—, —C(=O)—, —SO$_2$—, —Si(CH$_3$)$_2$—, —(CR'$_2$)$_p$— (wherein 1≤p≤10, R' is hydrogen, a hydroxy group, a C1 to C3 alkyl group, or a C1 to C3 fluoroalkyl group), or (CF$_2$)$_q$ (wherein 1≤q≤10), and X is Cl, OH, or OCH$_3$.

The diamine monomer, the acid dianhydride monomer, and the aromatic dicarbonyl monomer may be appropriately selected depending on the structure of the final poly(imide-amide). The polymerization may be performed under known conditions (e.g., temperature and time) for preparation of polyamic acid and polyamide. The solvent may be a known polymerization solvent for preparation of polyamic acid and polyamide.

Examples of the acid dianhydride monomer may include 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 2,2',3,3'-biphenyl tetracarboxylic dianhydride; 4,4'-bis(3,4-dicarboxyphenoxy)biphenyl dianhydride; bis(2,3-dicarboxylphenyl) ether dianhydride; 4,4'-bis(2,3-dicarboxyphenoxy) diphenylether dianhydride; 4,4'-bis(3,4-dicarboxyphenoxy) diphenylether dianhydride; bis(3,4-dicarboxylphenyl) sulfide dianhydride; 4,4'-bis(2,3-dicarboxyphenoxy) diphenylsulfide dianhydride; 4,4'-bis(3,4-dicarboxyphenoxy) diphenylsulfide dianhydride; bis(3,4-dicarboxylphenyl) sulfone dianhydride; 4,4'-bis(2,3-dicarboxyphenoxy) diphenylsulfone dianhydride; 4,4'-bis(3,4-dicarboxylphenoxy) diphenylsulfone dianhydride; 3,3',4,4'-benzophenone tetracarboxylic acid dianhydride; 2,2',3,3'-benzophenone tetracarboxylic acid dianhydride; 2,3,3'4'-benzophenone tetracarboxylic acid dianhydride; 4,4'-bis(3,4-dicarboxylphenoxy) benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy)phenyl] propane dianhydride; 2,2-bis[4-(3,4-dicarboxylphenoxy)phenyl] propane dianhydride; 4-(2,3-dicarboxylphenoxy)-4'-(3,4-dicarboxylphenoxy) diphenyl-2,2-propane dianhydride; 2,2-bis[4-(3,4-dicarboxylphenoxy-3,5-dimethyl) phenyl] propane dianhydride; 2,3,4,5-thiophene tetracarboxylic dianhydride; 2,3,5,6-pyrazine tetracarboxylic dianhydride; 1,8,9,10- phenanthrene tetracarboxylic dianhydride; 3,4,9,10-perylene tetracarboxylic dianhydride; 1,3-bis(3,4-dicarboxylphenyl)hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy)phenyl] hexafluoropropane dianhydride; 1,1-bis[4-(3,4-dicarboxylphenoxy)phenyl]-1-phenyl-2,2,2-trifluoroethanedianhydride; and 4,4'-bis[2-(3,4-dicarboxylphenyl)hexafluoroisopropyl] diphenyl ether dianhydride, and the like, but are not limited thereto. Such acid dianhydride monomers may be synthesized by a known method, or may be commercially available.

The acid dianhydride monomer may be used alone or as a mixture of two or more dianhydrides, if needed. For example, the acid dianhydride monomer may be a mixture of 4,4'-(hexafluoroisopropylidene) diphthalic anhydride (6FDA) as a first acid anhydride and biphenyl tetracarboxylic acid dianhydride (BPDA) as a second acid anhydride.

In an embodiment, the diamine monomer may be one or more selected from the following compounds:

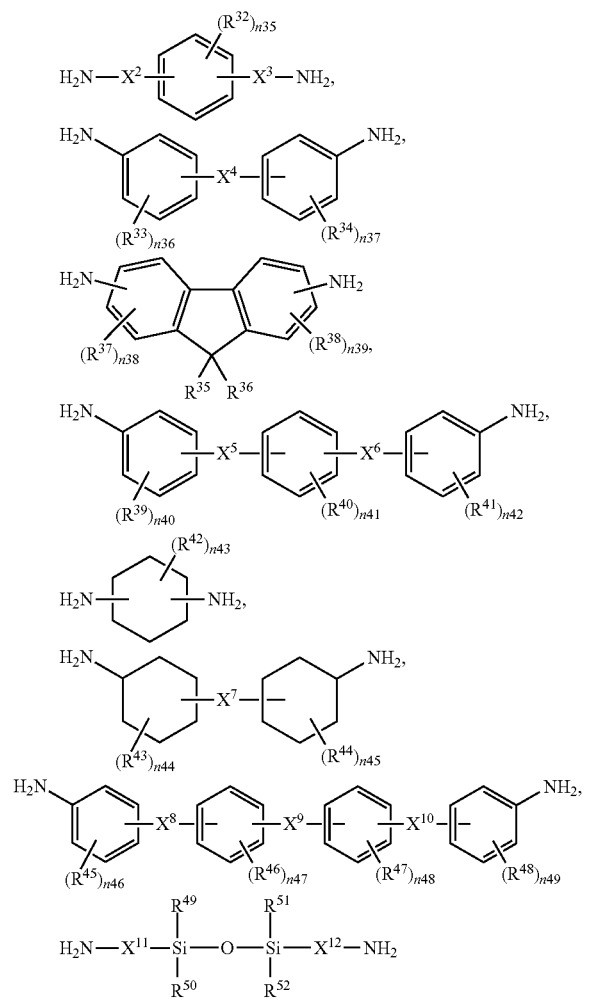

wherein, $R^{32}$ to $R^{52}$ are the same or different from each other, and are each independently hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different from each other, and are each independently a single bond, a substituted or unsubstituted C1 to C10 alkylene group, a substituted or unsubstituted C3 to C10 cycloalkylene group, a substituted or unsubstituted C6 to C15 arylene group, $SO_2$, O, CO, or a combination thereof, n35 to n37 and n40 to n49 are integers of 0 to 4, and n38 and n39 are integers of 0 to 3.

For non-limiting examples, the diamine monomer may be selected from the following chemical formulae:

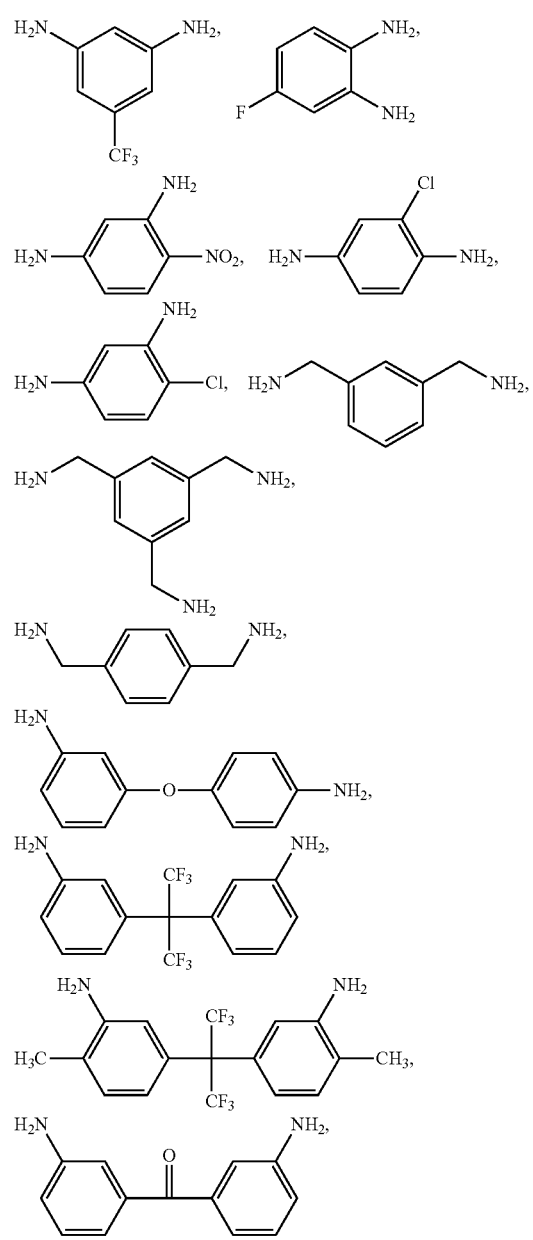

-continued

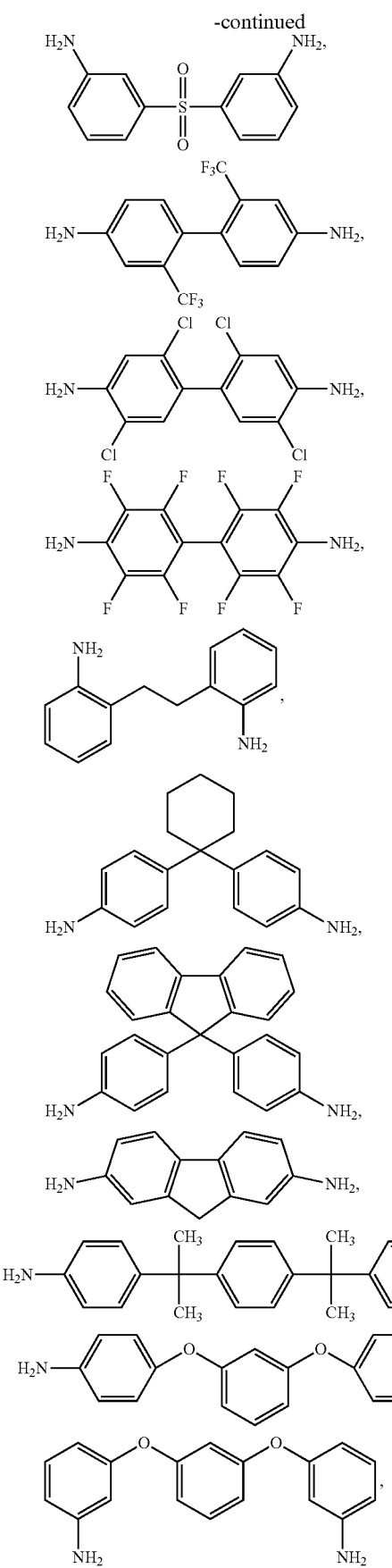
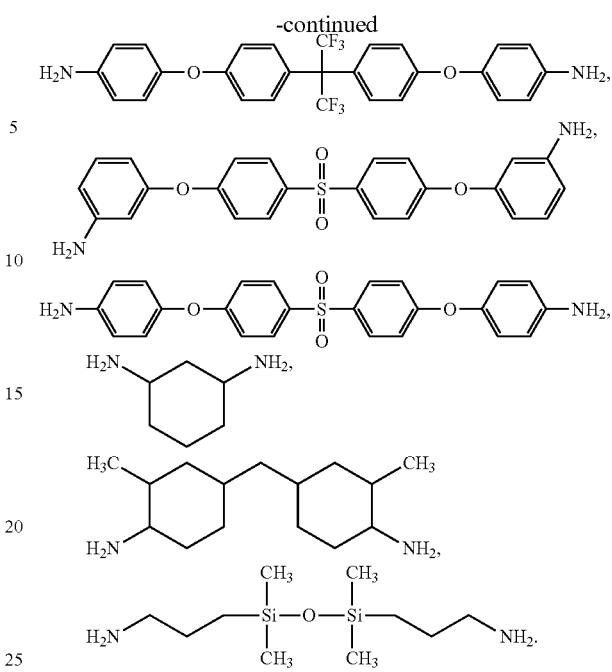

Examples of the diamine monomer may be m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis (3-aminophenyl) ether; bis(4-aminophenyl)diethyl silane; bis(4-aminophenyl) diphenyl silane; bis(4-aminophenyl) ethyl phosphine oxide; bis(4-aminophenyl) phenyl phosphine oxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 2,2'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane; bis[2-(3-aminophenyl)hexafluoroisopropyl] diphenyl ether; 3,3'-diamino-1, 1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl]

hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl)buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminocyclohexylmethane, 2,2'-bis(trifluoromethyl)benzidine (TFDB), and diaminofluorene, 1,1-bis(4-aminophenyl) cyclohexane (BACH), 4,4'-(hexafluoroisopropylidene) bis (4-phenoxyaniline) (6FIDDA), and 9,9-bis(4-aminophenyl) fluorene (BAPF), and the like, but are not limited thereto.

The diamine monomer may be used alone or as a mixture of two or more, if needed (e.g., when a polyimide copolymer is prepared). Such diamine monomers may be synthesized by a known method, or may be commercially available.

Examples of the aromatic dicarbonyl monomer may be terephthalic acid, dimethyl terephthalate, terephthaloyl chloride (TPCL), 4,4'-benzoyl chloride, 2,6-naphthalene dicarboxylic dichloride, or 1,5-naphthalene dicarboxylic dichloride, but are not limited thereto.

In an embodiment, at least one of the acid dianhydride monomer(s) and the diamine monomer(s) may be selected so that the following definitions for $A_1$, $A_2$, and $A_3$ in the Chemical Formula 1 and Chemical Formula 2 are met:

at least one of $A_1$, $A_2$, and $A_3$ includes an aromatic or aliphatic ring substituted with at least one C1 to C10 fluoroalkyl group; two aliphatic or aromatic rings linked to each other by a C1 to C10 alkylene group having at least one substituent selected from a C1 to C10 linear or branched aliphatic hydrocarbon group, a C1 to C10 fluorine alkyl group, a C6 to C20 aromatic hydrocarbon group, and a C6 to C20 alicyclic hydrocarbon group; or a combination thereof.

Examples of the acid dianhydride monomer satisfying the definition may include 6FDA, 1,3-bis(3,4-dicarboxylphenyl)hexafluoropropane dianhydride, 1,1-bis(3,4-dicarboxylphenyl)-1-phenyl-2,2,2-trifluoroethane dianhydride; 2,2-bis[4-(3,4-dicarboxylphenoxy)phenyl] hexafluoropropane dianhydride, 1,1-bis[4-(3,4-dicarboxylphenoxy) phenyl]-1-phenyl-2,2,2-trifluoroethanedianhydride; 4,4'-bis[2-(3,4-dicarboxylphenyl)hexafluoroisopropyl] diphenyl ether dianhydride, 2,2-bis(3,4-dicarboxylphenyl) propane dianhydride, 2,2-bis[4-(2,3-dicarboxylphenoxy) phenyl] propane dianhydride; 2,2-bis[4-(3,4-dicarboxylphenoxy) phenyl] propane dianhydride; 4-(2,3-dicarboxylphenoxy)-4'-(3,4-dicarboxylphenoxy)diphenyl-2,2-propane dianhydride; or 2,2-bis[4-(3,4-dicarboxylphenoxy-3,5-dimethyl) phenyl]propane dianhydride, but are not limited thereto.

Examples of the diamine monomer satisfying the definition may include 2,2'-bis(trifluoromethyl)benzidine (TFDB), 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane, 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminocyclohexylmethane and diaminofluorene, 1,1-bis(4-aminophenyl)cyclohexane (BACH), 4,4'-(hexafluoroisopropylidene) bis(4-phenoxyaniline) (6FIDDA), and 9,9-bis(4-aminophenyl)fluorene (BAPF), but are not limited thereto.

In another embodiment, the plastic substrate may include polyimide including a repeating unit represented by the following Chemical Formula 1.

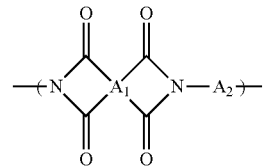

Chemical Formula 1

In Chemical Formula 1, definitions of $A_1$ and $A_2$ are the same as defined above.

The polyimide may be a polyimide copolymer including a first repeating unit represented by the following Chemical Formula 1-1 and a second repeating unit represented by the following Chemical Formula 1-2:

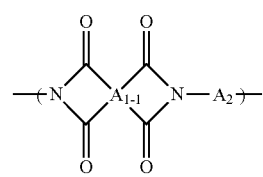

Chemical Formula 1-1

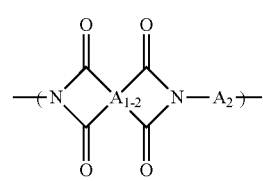

Chemical Formula 1-2 wherein, in the above chemical formulae, $A_{1-1}$ is represented by the following formula:

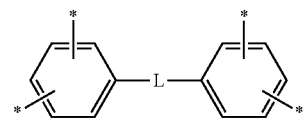

wherein L is a single bond, —O—, —S—, —C(=O)—, —SO$_2$—, —Si(CH$_3$)$_2$—, or —(CR'$_2$)$_p$— (wherein $1 \leq p \leq 10$, and R' is hydrogen, a hydroxy group, a C1 to C3 alkyl group, or a C1 to C3 fluoroalkyl group), $A_{1-2}$ is represented by the following formula,

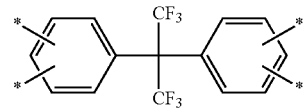

and $A_2$ is represented by the following formula:

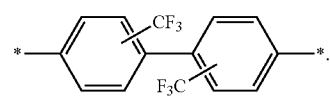

The details for the first repeating unit and the second repeating unit are the same as described above.

The methods of preparing a film from the polyimide polymer or copolymer are similar to the known methods of manufacturing a polyimide film, and are not particularly limited. For example, a solution including the final polymer (i.e., polyimide) or the precursor thereof (polyamic acid) is prepared, the solution is casted on a support, and the heat treatment is performed, if needed (e.g., for imidizing and/or for drying) to provide a film.

In another embodiment, the plastic substrate may include polycarbonate.

Figure 2:
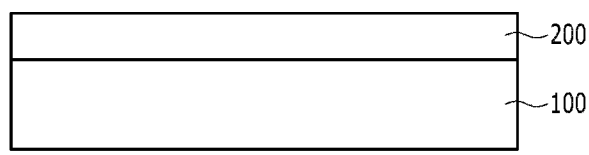
FIG. 2 is a schematic view showing a cross-section of a window for a display device according to an embodiment.
Figure 3:
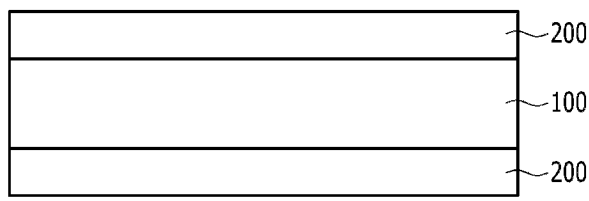
FIG. 3 is a schematic view showing a cross-section of a window for a display device according to another embodiment.

The window for a display device includes a hard coating layer 200 disposed on one side or both sides of the plastic substrate 100 (referring to FIGS. 2 and 3). The hard coating layer may include one or more layers. The hard coating layer heightens surface hardness of the window. When the window includes such a hard coating layer, a window for a display device according to an embodiment may have hardness of greater than or equal to about 7H, for example greater than or equal to about 9H. Materials for forming a hard coating layer (that is, the hard coating material) may be thermally curable or photocurable materials. Examples of the material may be an acrylate polymer, polycaprolactone, a urethane-acrylate copolymer, polyrotaxane, an epoxy polymer, an organosilicon material such as polysilsesquioxane, and an inorganic hard coating material such as silica, but are not limited thereto. The acrylate polymer may be a polymer of a monomer mixture including multi-functional acrylate monomers. Examples of the multi-functional acrylate monomer may be trimethylolpropane triacrylate (TMPTA), ethoxylated trimethylolpropane triacrylate (TMPEOTA), propoxylated glycerine triacrylate (GPTA), pentaerythritol tetraacrylate (PETA), and dipentaerythritol hexaacrylate (DPHA), but are not limited thereto. The urethane acrylate material and the multi-functional acrylate material have excellent adherence and high productivity.

The window for a display device according to an embodiment has excellent mechanical properties such as a high rigidity and tensile strength, and simultaneously has good optical properties such as a low yellow index. Particularly, when not using a glass substrate, the window is light in weight and has high flexibility, so it is usable in a flexible display.

In another embodiment, a display device including the window is provided.

The window may be disposed on a display module of the display device. The display module may be a liquid crystal display module, an organic light emitting display module, a plasma display module, an electric field effect display module, an electrophoretic display module, and the like, but is not limited thereto.

Hereafter, this disclosure is described in detail with reference to examples. The following examples and comparative examples are not restrictive, but are illustrative.

EXAMPLES

Example 1: Manufacture of Poly(Imide-Amide) Film I 83,988 grams of a dimethyl acetamide (DMAc) solvent is introduced into a reactor under a nitrogen atmosphere and mixed with 13.428 moles (mol) of pyridine as a HCl scavenger. Then, 15.614 mol of 2,2'-bis-trifluoromethyl-4,4'-biphenyldiamine (TFDB) is added thereto and the reaction mixture was stirred to provide a TFDB solution. 5.4649 mol of terephthaloyl chloride (TPCL) is added into the solution to carry out a condensation reaction at 30° C. for 120 minutes to provide a TFDB solution including polyamide. 3.9035 mol of 4,4'-hexafluoroisopropylidene diphthalic anhydride (6FDA) and 6.2456 mol of 3,3',4,4'-biphenyltetracarboxylic dianhydride (BPDA) are added into the TFDB solution including polyamide to carry out a reaction at 30° C. for 36 hours to provide a poly(amic acid-amide) solution.

15.225 mol of acetic anhydride, which is a chemical imidization catalyst, is added into poly(amic acid-amide) solution and the reaction mixture is agitated for 30 minutes. Then, the same number of moles of pyridine is added thereto and the reaction mixture is agitated at 30° C. for 36 hours. The chemically-imidized solution is purified as a powder through a precipitation process as follows. First, the solution is added into distilled water to be solidified, and then the solid is ground in water to provide a powder. Subsequently, the powder is recovered by filtering and then ground in water to provide a fine powder. Then the powder recovered through filtering is dispersed and agitated in alcohols to extract impurities. Finally, the powder recovered through filtering is vacuum dried at 120° C. for 24 hours to obtain pure product. The obtained powder is re-dissolved in dimethyl acetamide to provide a poly(imide-amide) copolymer solution. The obtained solution is coated on a glass plate by a doctor blade method to provide a film and pre-baked on a heating plate at 80° C. for 1 hour. Then, the film is heated in a furnace or an oven up to 250° C. at a rate of 3° C./minute to perform drying and thermal imidization to provide a final film having a thickness of 50 µm.

Example 2: Manufacture of Poly(Imide-Amide) Film II

A film is obtained in accordance with the same procedure as in Example 1, except that the film has a thickness of 80 µm.

Example 3: Manufacture of Poly(imide-amide) Film III

A film is obtained in accordance with the same procedure as in Example 1, except that the molar ratio of BPDA:6FDA:TPCL is 20:15:65.

Example 4: Manufacture of Poly(Imide-Amide) Film IV

A film is obtained in accordance with the same procedure as in Example 1, except that the molar ratio of BPDA:6FDA:TPCL is 40:15:45.

Example 5: Manufacture of Polyimide Film I 83,988 grams of a DMAc solvent is introduced into a reactor under a nitrogen atmosphere and mixed with 15.614 mol of 2,2'-bis-trifluoromethyl-4,4'-biphenyldiamine (TFDB). The reaction mixture is stirred until the solids are dissolved to provide a TFDB solution. 2.3421 mol of 4,4' hexafluoroisopropylidene diphthalic anhydride (6FDA) and 13.2719 mol of 3,3',4,4'-biphenyltetracarboxylic dianhydride (BPDA) are added into the solution to carry out a reaction at 30° C. for 36 hours to provide a polyamic acid.

The obtained polyamic acid is chemically imidized and thermally imidized in accordance with the same procedure as in Example 1 to provide a polyimide film having a thickness of 50 μm.

Example 6: Manufacture of Polyimide Film II

A polyimide film is obtained in accordance with the same procedure as in Example 5, except that the molar ratio of BPDA:6FDA is 10:90.

Example 7: Manufacture of Polyimide Film III

A polyimide film is obtained in accordance with the same procedure as in Example 6, except that the film has a thickness of 100 μm.

Example 8

A commercially available polycarbonate film (S-148) having a thickness of 50 μm (manufactured by Teijin Chemical) is prepared.

Comparative Example 1

A commercially available PEN film (NX10) having a thickness of 50 μm (manufactured by SKC) is prepared.

Comparative Example 2

A commercially available PET film (SR50) having a thickness of 50 μm (manufactured by SKC) is prepared.

1. Yield Strain

The poly(imide-amide) films obtained from Examples 1 to 4, the polyimide films obtained from Examples 5 to 7, the polycarbonate (PC, S-148) film according to Example 8 obtained from Teijin, the PEN (NX10) according to Comparative Example 1, and the PET (SR50) according to Comparative Example 2 obtained from SKC are measured for a modulus and a yield strain at a temperature of 85° C. and relative humidity of 85% as follows, and the results are shown in Table 2.

A film is prepared to have a size of greater than or equal to a 25 millimeters (mm) in length and a 5.3 mm in width. Then, the film is held by a grid and stretched to prepare a specimen having the initial length of 15-20 mm. A DMA (Dynamic Mechanical Analyzer, manufacturer: TA Instruments Trade name: Q800) is connected to a relative humidity chamber, and a specimen is mounted in the chamber and controlled at about 85° C. and relative humidity of 85%. Then, the specimen is allowed to stand for 30 minutes to provide a stress-strain curve by constantly increasing force at 0.5 N/min. From the curve, the elastic modulus at the initial linear region may be obtained. Since the DMA software does not directly provide a yield strain, the linear region is defined by the case when the coefficient of determination ($R^2$) of the linear trend line is the maximum or greater than or equal to about 0.999, and the yield strain is defined by a strain approaching the stress-strain curve at 0.2 offset of slope line.

2. Flexure Resistance

The films obtained from Examples 1 to 8 and Comparative Examples 1 and 2 are bent at a curvature radius of 3 mm and allowed to stand at a high temperature and high humidity (about 85° C. and relative humidity of 85%) for 30 minutes. Then, the degree of bending (or a strain angle) of the film after being allowed to stand is measured by a goniometer with respect to the flat film.

3. Yellow Index

Yellow index is measured using a UV spectrophotometer (Spectrophotometer, Konica Minolta, cm-3600d) with reference to the ASTM E313 standard.

TABLE 2

|  | Thickness | Modulus (GPa) | Yield strain (%) | Strain angle (degree) | Yellow index |
|---|---|---|---|---|---|
| Example 1 | 50 μm | 4.5 | 1.4 | 45 | 2.5 |
| Example 2 | 80 μm | 3.7 | 1.2 | 36 | 3.1 |
| Example 3 | 50 μm | 5.4 | 1.1 | 45 | 3.0 |
| Example 4 | 50 μm | 4.7 | 1.2 | 43 | 2.7 |
| Example 5 | 50 μm | 5.2 | 1.3 | 35 | 3.5 |
| Example 6 | 50 μm | 3.6 | 1.3 | 35 | 1.5 |
| Example 7 | 100 μm | 3.2 | 1.1 | 50 | 2.0 |
| Example 8 | 50 μm | 2.4 | 2.3 | 35 | 0.6 |
| Comparative Example 1 | 50 μm | 2.1 | 0.69 | 85 | 1.4 |
| Comparative Example 2 | 50 μm | 2.1 | 0.67 | 150 | 2.2 |

From the results shown in Table 2, as the films obtained from Examples 1 to 8 have a yield strain of greater than or equal to about 0.8% even under the severe conditions of a temperature of 85° C. and relative humidity of 85% and have a low strain angle, it is confirmed that the films may have high flexure resistance under the conditions of a high temperature and high humidity. Particularly, the high yield strain is a main parameter to provide a high flexure resistance regardless modulus. In addition, the films obtained from Examples 1 to 8 have a yellow index of less than or equal to about 3.5, so they are suitable for providing a window film satisfying the excellent light characteristic and flexure resistance. Accordingly, the films may be applicable to the window for a flexible display having high yield elongation under an atmosphere of a high temperature and high humidity.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:

1. A window for a display device comprising:

a plastic substrate and a hard coating layer disposed on at least one side of the plastic substrate, wherein the plastic substrate has a yield strain of greater than or equal to about 0.8% at about 85 degrees Celsius and 85% relative humidity, wherein the plastic substrate has a thickness of about 25 micrometers to 80 micrometers, and wherein the plastic substrate comprises a poly(imide-amide) copolymer including a imide unit and an amide unit, wherein the imide unit comprises a first repeating unit represented by the following Chemical Formula 1-1 and a second repeating unit represented by the following Chemical Formula 1-2:

Chemical Formula 1-1

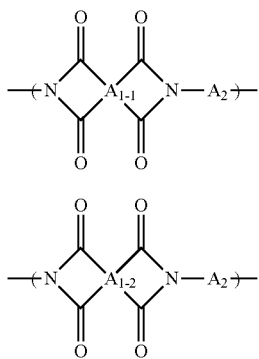

Chemical Formula 1-2 wherein $A_{1-1}$ is represented by the following formula:

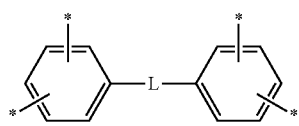

wherein L is a single bond, —O—, —S—, —C(=O)—, —SO$_2$—, —Si(CH$_3$)$_2$—, or —(CR'$_2$)$_p$— wherein 1≤p≤10, and R' is hydrogen, a hydroxy group, a C1 to C3 alkyl group, or a C1 to C3 fluoroalkyl group), $A_{1-2}$ is represented by the following formula:

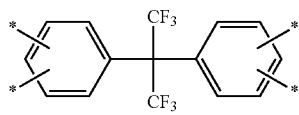

and
$A_2$ is represented by the following formula:

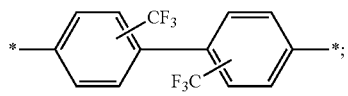

wherein the amide unit comprises a moiety represented by Chemical Formula 2:

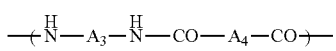

Chemical Formula 2 wherein in Chemical Formula 2,
$A_3$ is a moiety selected from a substituted or unsubstituted divalent C5 to C24 aliphatic cyclic group, a substituted or unsubstituted divalent C6 to C24 aromatic ring group, a substituted or unsubstituted divalent C4 to C24 hetero aromatic ring group, and -L-SiR$_2$—O—SiR$_2$-L- wherein L is a single bond or a C1 to C10 alkylene group, wherein the aliphatic or aromatic ring group is present alone; two or more rings are fused to each other to provide a polycyclic aromatic ring; or the two or more aliphatic rings or the two or more aromatic rings are linked through a single bond, —O—, —S—, —CO—, —CH(OH)—, —SO$_2$—, —Si(CH$_3$)$_2$—, —(CH$_2$)$_p$— wherein 1≤p≤10, —(CF$_2$)$_q$— wherein 1≤q≤10, a C1 to C10 divalent alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, or —C(=O)NH—, and $A_4$ is a substituted or unsubstituted divalent phenylene residual group, a substituted or unsubstituted divalent naphthalene residual group, or a residual group where two substituted or unsubstituted aromatic rings are linked through a single bond, —O—, —S—, —C(=O)—, —SO$_2$—, —Si(CH$_3$)$_2$—, —(CR'$_2$)$_p$— wherein 1≤p≤10, R' is hydrogen, a hydroxy group, a C1 to C3 alkyl group, or a C1 to C3 fluoroalkyl group), or (CF$_2$)$_q$ wherein 1≤q≤10.

2. The window for a display device of claim 1, wherein the $A_{1-2}$ is present in an amount of greater than or equal to about 20% based on a total molar amount of moieties derived from acid anhydrides.

3. The window for a display device of claim 1, wherein the plastic substrate has a yellow index ASTM E313 of less than or equal to 3.5.

4. The window for a display device of claim 1, wherein the hard coating layer comprises an acrylate polymer, a polycaprolactone, a urethane-acrylate copolymer, polyrotaxane, an epoxy polymer, polysilsesquioxane, or a combination thereof.

5. The window for a display device of claim 1, wherein in the formula of the $A_{1-1}$, L is a single bond,
wherein the $A_3$ is represented by the following formula:

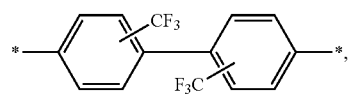

and
wherein the $A_4$ is a substituted or unsubstituted divalent phenylene residual group.

6. A display device comprising the window of claim 1.

* * * * *